E. WILSON.
MECHANICAL COLANDER.
APPLICATION FILED OCT. 17, 1921.

1,425,431.

Patented Aug. 8, 1922.
2 SHEETS—SHEET 1.

WITNESS:

Elizabeth Wilson.
INVENTOR

BY Victor J. Evans
ATTORNEY

E. WILSON.
MECHANICAL COLANDER.
APPLICATION FILED OCT. 17, 1921.
1,425,431.
Patented Aug. 8, 1922.
2 SHEETS—SHEET 2.
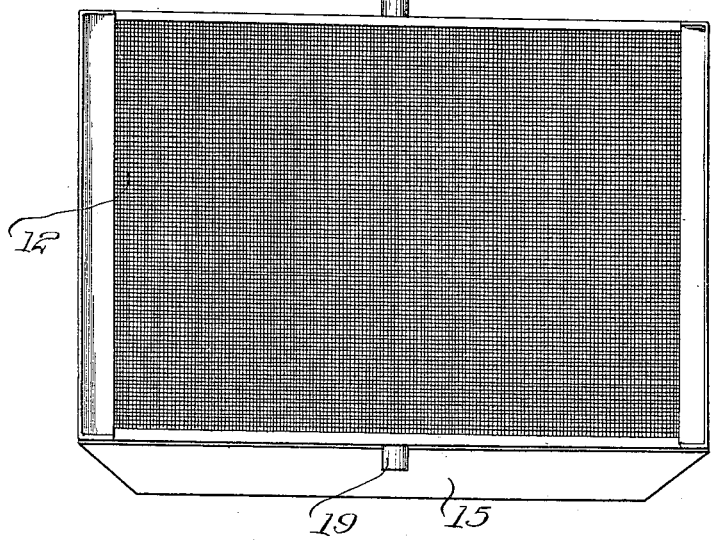
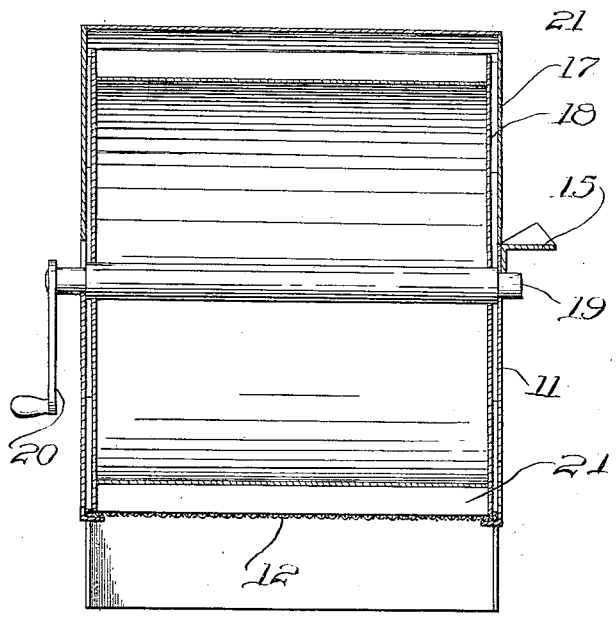
Elizabeth Wilson.
INVENTOR

UNITED STATES PATENT OFFICE.

ELIZABETH WILSON, OF PLATTSMOUTH, NEBRASKA.

MECHANICAL COLANDER.

1,425,431. Specification of Letters Patent. Patented Aug. 8, 1922.

Application filed October 17, 1921. Serial No. 508,138.

*To all whom it may concern:*

Be it known that I, ELIZABETH WILSON, a citizen of the United States, residing at Plattsmouth, in the county of Cass and State of Nebraska, have invented new and useful Improvements in Mechanical Colanders, of which the following is a specification.

This invention relates to kitchen utensils, particularly to colanders and has for its object the provision of a novel device of this character for the purpose of separating the pulp from the seeds and skins of fruits, vegetables and the like as for instance in preparing certain conserves, jams or preserves, catsup and the like.

An important and more specific object is the provision of a colander of this character which includes a casing having a perforated bottom within which is disposed a rotary drum having a handle and designed to be turned for acting upon the mass of material within the casing, this drum carrying a plurality of strips or cleats which operate to macerate or break up the material so that the juice and finer particles of pulp may be pressed through the bottom while the skin, seeds and other matter will remain inside the device.

An additional object is the provision of a device of this character which will be simple and inexpensive in manufacture, very easy to operate, positive in action, durable in service and a general improvement in the art.

Figure 1:
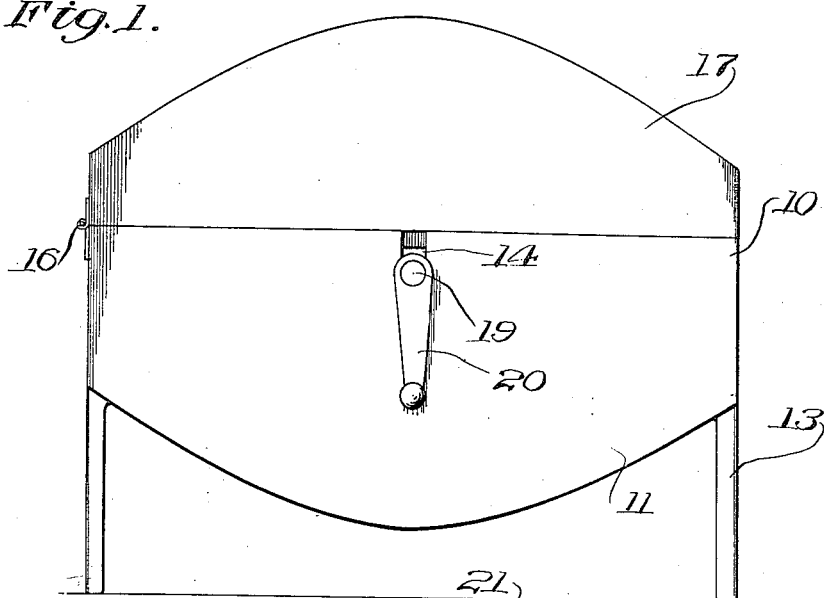
Figure 2:
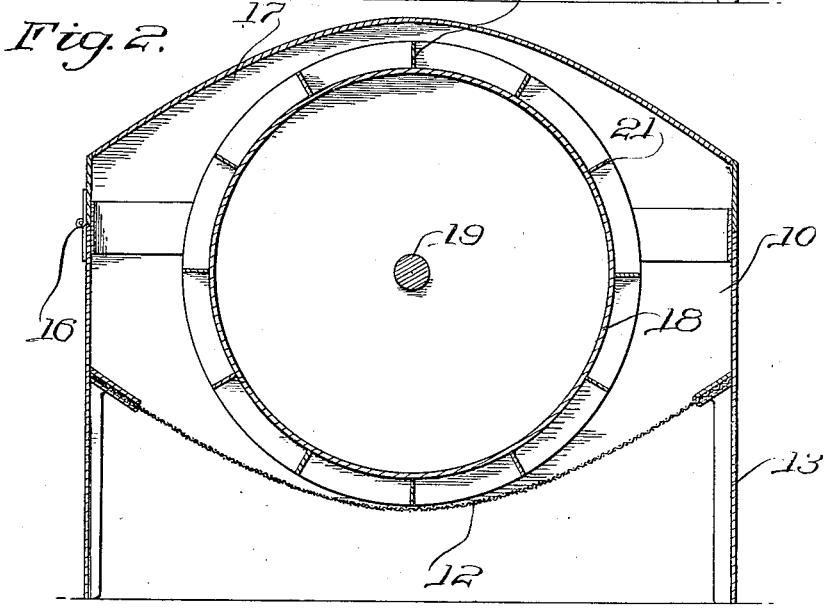

With the above and other objects and advantages in view, the invention consists in the details of construction to be hereinafter more fully described and claimed, and illustrated in the accompanying drawings in which, Figure 1 is a side elevation of my device, Figure 2 is a longitudinal sectional view,
Figure 3 is a cross-sectional view,
Figure 4 is a bottom plan view.

Referring more particularly to the drawings I have shown my device as comprising an open top casing 10 of substantially semi-elliptical shape and including sides 11, a curved bottom 12 formed either of wire screen or perforated metal, and depending end walls 13 which constitute legs. It is designed that this casing be placed within or over a suitable pan or other receptacle. The opposite sides 11 of the casing are formed with slots 14 which extend downwardly from the edge and formed upon one side is a trough like spout 15. It will be understood that this entire casing may be formed of any suitable metal such as aluminum, tin or the like and that if preferred it may be enameled or japanned or provided with any other suitable finish.

Hinged upon the upper edge of one end wall as shown at 16 is a cover 17 which is likewise of substantially semi-elliptical shape and which is for the purpose of closing the top of the casing 10. This colander may have its free end provided with any suitable handle whereby it may be easily opened or closed and may also be provided with any conventional catch for holding the cover in closed position.

Located within the casing is a cylindrical drum 18 which is formed of imperforate material and which is mounted upon a shaft 19 which is disposed within the slots 14 in the sides of the casing. One end of this shaft 19 is provided with a suitable crank handle 20 by means of which the drum may be rotated. Formed or secured upon the periphery of the drum is a plurality of cleats or strips 21 which are for the purpose of macerating or mashing up the material placed within the device.

In the use of the device it will be seen that the fruit or vegetable pulp or other matter is placed within the casing and the drum is placed in position after which the cover 17 is closed and locked. The operator then turns the handle 20 to rotate the drum 18 and the weight of the drum will of course tend to press the juice out of the material, the cleats or strips 21 further operating to mash up the material and break it up so that the pulp will be easily separated from the seeds, ends and coarser particles of material. It will be observed that the device is to be placed upon or with a pan or other receptacle so that the juice and fine portions of the pulp will pass through the perforated bottom 12 while the coarser material such as seeds, skins, and other matter will remain within the casing and may be poured therefrom by partially or entirely inverting the casing after the drum has been removed, the spout or chute 15 serving to facilitate this operation. It may of course be necessary to make use of a suitable paddle of any kind for pressing the material and starting the operation of pressing out the juice, etc.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

A device of the character described comprising a rectangular open topped casing formed in opposite sides with slots extending downwardly from the open edge, supporting legs at the ends of the casing, a partially elliptical bottom for the casing formed of wire screen, a cylindrical drum having a shaft seating within said slots, one end of the shaft being provided with a crank handle, and said drum being movable downwardly into engagement with said screen bottom, the slots permitting actuation of the drum in spaced relation to the bottom, said drum being formed at its ends with flanges and having its periphery formed with radial ribs connecting said flanges.

In testimony whereof I affix my signature.

ELIZABETH WILSON.